United States Patent
Wang

(10) Patent No.: US 8,332,584 B2
(45) Date of Patent: Dec. 11, 2012

(54) METHOD OF COMBINING AND MANAGING FILE SYSTEMS FOR MEMORY SPACE AND A COMPUTER SYSTEM

(75) Inventor: Kuo-Chu Wang, Tapei Hsien (TW)

(73) Assignee: Acer Inc., Taipei Hsien (TW)

( * ) Notice: Subject to any disclaimer, the term of this patent is extended or adjusted under 35 U.S.C. 154(b) by 783 days.

(21) Appl. No.: 12/497,766

(22) Filed: Jul. 6, 2009

(65) Prior Publication Data

US 2009/0282195 A1   Nov. 12, 2009

(30) Foreign Application Priority Data

Sep. 5, 2008   (TW) .............................. 97134304 A

(51) Int. Cl.
*G06F 12/02*   (2006.01)
(52) U.S. Cl. ............. 711/115; 711/2; 711/165; 711/170
(58) Field of Classification Search .............. 711/2, 115, 711/165, 170
See application file for complete search history.

(56) References Cited

U.S. PATENT DOCUMENTS

| 7,073,010 | B2 * | 7/2006 | Chen et al. .................... 710/313 |
| 7,386,559 | B1 * | 6/2008 | Desai et al. ............................ 1/1 |
| 7,461,088 | B2 * | 12/2008 | Thorman et al. ....................... 1/1 |
| 2008/0172397 | A1 * | 7/2008 | Maeda et al. ................. 707/100 |
| 2009/0172049 | A1 * | 7/2009 | Hahn et al. .................... 707/205 |
| 2010/0153635 | A1 * | 6/2010 | LaPanse et al. ............... 711/104 |
| 2010/0186077 | A1 * | 7/2010 | Chang et al. ....................... 726/9 |
| 2010/0211547 | A1 * | 8/2010 | Kamei et al. .................. 707/649 |
| 2010/0257218 | A1 * | 10/2010 | Vassilev et al. ............... 707/823 |

FOREIGN PATENT DOCUMENTS

CN    1517877 A    8/2004

OTHER PUBLICATIONS

Dmitry E. Oboukhov: "mhddfs.", ,[Online] Feb. 1, 2008, 2 pages, XP002625473, Retrieved from the Internet: URL:http://svn.uvw.ru/mhddfs/trunk/mhddfs.1> [retrieved on Mar. 1, 2011].
Anonymous: "UnionFS", ,[ Online] Jun. 11, 2008 , 2 pages, XP002625502, Wikipedia, the free encyclopedia. Retrieved from the Internet: URL:http://en.wikipedia.org/w/index.php?title=UnionFS&oldid=218603085> [retrieved on Mar. 1, 2011].
Anonymous: "The driver combines a several mount points into the single", Internet Citation, Jan. 1, 2008 , XP007920483, Retrieved from the Internet: URL:http://svn.uvw.ru/mhddfs/trunk/README [retrieved on Apr. 10, 2012].

* cited by examiner

*Primary Examiner* — John Lane
(74) *Attorney, Agent, or Firm* — Alan Kamrath; Kamrath IP Lawfirm, PA

(57) ABSTRACT

A method of managing memory storage space and a computer system using the same uses a computer including a storage device and an expansion slot. The method has the steps of: detecting whether there is a memory card in the expansion slot; combining the storage space of the storage device and the memory card to form a combined storage space; and using application software to manage the combined storage space. At least one file stored in the combined storage space may be selected to move between the storage device and the memory card via the application software.

19 Claims, 7 Drawing Sheets

METHOD OF COMBINING AND MANAGING FILE SYSTEMS FOR MEMORY SPACE AND A COMPUTER SYSTEM

BACKGROUND OF THE INVENTION

1. Field of the Invention

The present invention relates to a method of managing memory storage space and a computer system, and, more particularly, to a method of managing and increasing memory storage space of the computer.

2. Description of the Related Art

With the rapid exchange of information and dramatic improvements in computer technology, digital data such as text documents, music, videos or images has become more and more ubiquitous. These digital files sometimes can be hundreds or thousands of megabytes in size, which require a great deal of storage space. For typical desktop computers, if the storage space of the computer is not enough to contain the data, the storage space can be cleared or extended by burning an optical disk or adding a new hard disk. However, for devices that utilize flash memory as the storage media (such as MP3 players and smart PCs), the built-in flash memory is either welded in the device or too expensive to be replaced. When the storage space is insufficient, some data in the flash memory needs to be removed, or a new device with larger memory storage space is needed. This causes inconvenience, extra cost, and waste of resources.

Therefore, it is desirable to provide a method of managing memory storage space and a computer system to mitigate and/or obviate the aforementioned problems.

SUMMARY OF THE INVENTION

A main objective of the present invention is to provide a method of managing memory storage space which can combine the memory card and the storage device in the computer to increase the storage space of the computer.

In order to achieve the above mentioned objectives, the method of managing memory storage space of the present invention is used for a computer comprising a storage device and an expansion slot. The method comprises the steps of: detecting whether there is a memory card inserted into the expansion slot; combining the storage space of the storage device and the memory card to form a combined storage space; and using application software to manage the combined storage space. At least one file saved in the combined storage space may be selected to move between the storage device and the memory card via the application software. The combined storage space is formed by combining the storage space of the storage device and the storage space of the memory card via an Another Union File System (AUFS). Accordingly, when the storage space of the original storage device in the computer is insufficient, the extra memory card can be combined with the storage device to increase the storage space of the computer, and the application software is used for managing the files in the combined storage space. Furthermore, the application software individually displays the combined storage space with the storage space of the storage device and the storage space of the memory card for further data movement or access between the two.

A computer system of the present invention is used for the above mentioned method of managing memory storage space. The computer system comprises a computer and a memory card. The computer comprises a control module, a storage device, and at least one expansion slot. The storage device stores application software. The control module uses an Another Union File System (AUFS), and the control module is electrically connected to the storage device and the at least one expansion slot. The expansion slot corresponds to the memory card. When the control module detects a memory card in the at least one expansion slot, the control module utilizes the AUFS to combine the storage space of the storage device and the memory card to form a combined storage space. The application software can be used to manage the combined storage space, and the application software selects at least one file stored in the combined storage space to be moved between the storage device and the memory card.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
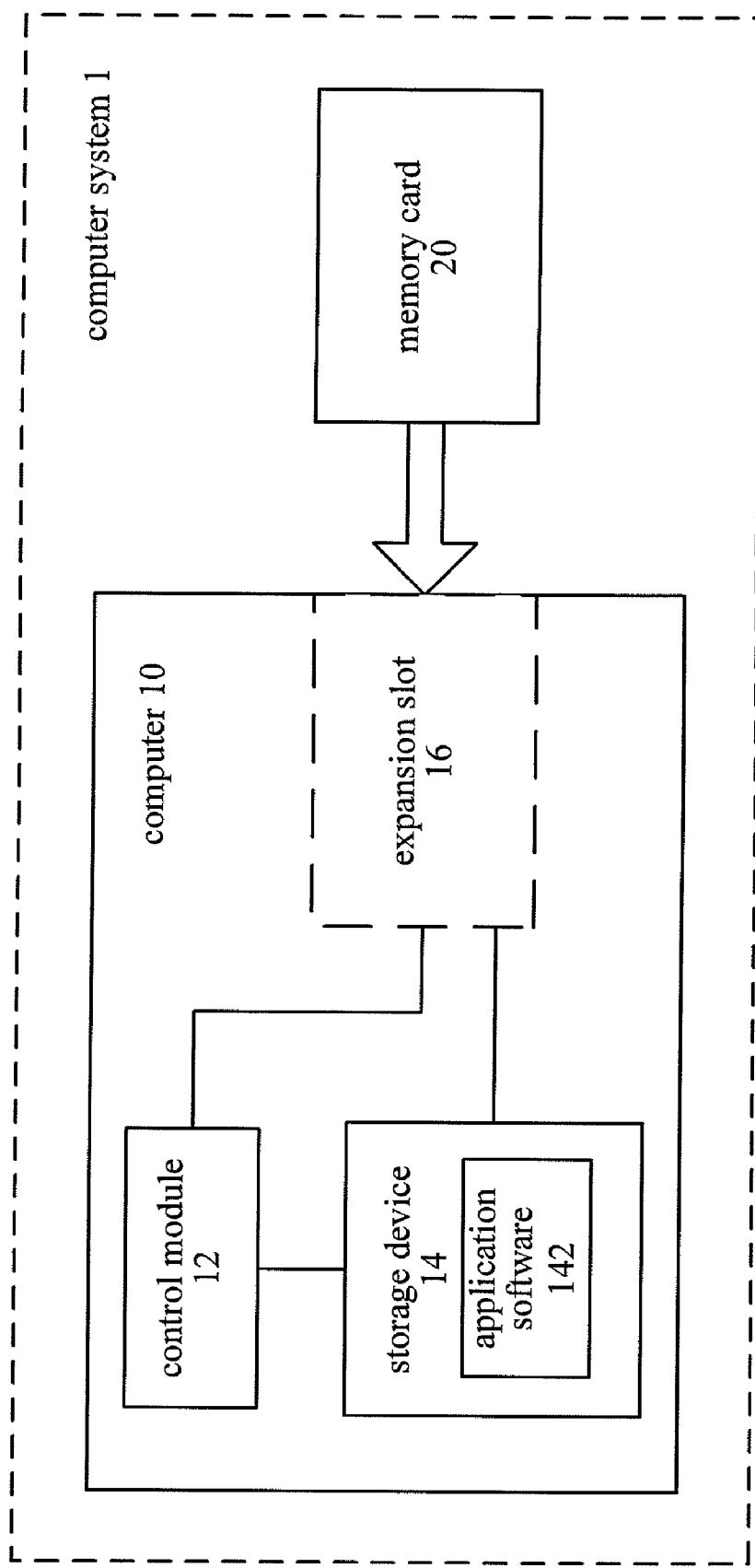
FIG. 1 is a system block drawing of a computer system of the present invention.

As shown in FIG. 1, a computer system 1 comprises a computer 10 and a memory card 20. The computer 10 comprises a control module 12, a storage device 14, and at least one expansion slot 16. The control module 12 utilizes an Another Union File System (AUFS), and the control module 12 is electrically connected to the storage device 14 and the at least one expansion slot 16. The expansion slot 16 corresponds to the memory card 20. The memory card 20 can be a SD/MMC card, a MS card, a CF card, an xD card or any other various memory cards. When the control module 12 detects a memory card 20 in the expansion slot 16, the control module 12 combines the storage space of the storage device 14 and the storage space of the memory card 20 to form a combined storage space via the AUFS. The storage device 14 stores application software 142, and the application software 142 individually displays the combined storage space with the storage space of the storage device 14 and the storage space of the memory card 20, so that the user can use the application software 142 to manage the files in the combined storage space.

Figure 2:
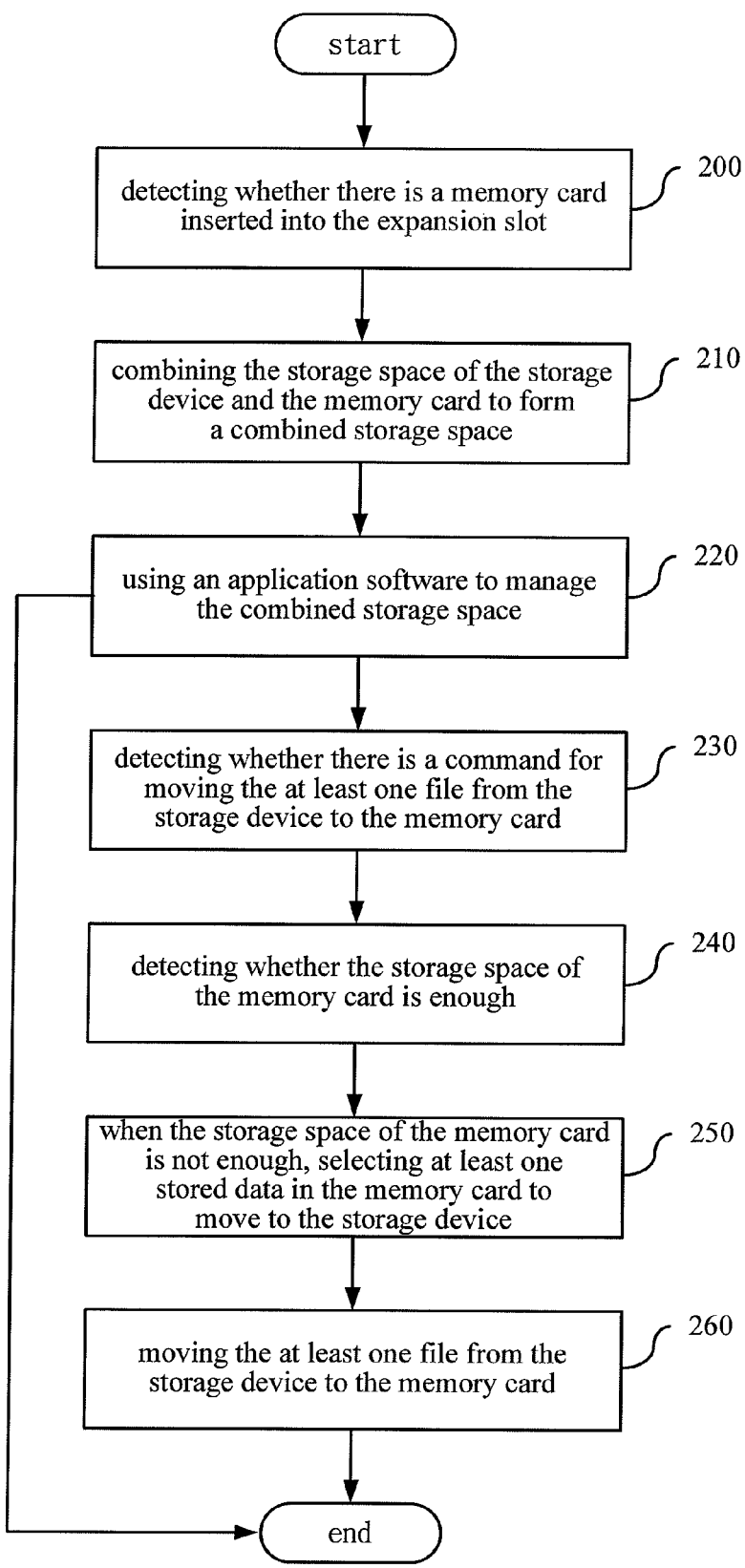
FIG. 2 is a flowchart of a method of managing memory storage space of the present invention.

FIG. 2 is a flowchart of a method of managing memory storage space of the present invention. Although the method of managing memory storage space of the present invention is explained with the computer system 1 shown in FIG. 1, the method of managing memory storage space of the present invention can be applied to other similar computer systems. As shown in FIG. 2, the method of managing memory storage space of the present invention includes step 200 to step 260.

The following description explains each step of the method of managing memory storage space of the present invention.

First, step 200: detecting whether there is a memory card inserted into the expansion slot 16. As shown in FIG. 1, the computer system 1 comprises the computer 10 and the memory card 20, and the computer 10 comprises the control module 12 and at least one expansion slot 16. The computer 10 utilizes the control module 12 to detect the status of the at least one expansion slot 16. When the memory card 20 is inserted into the expansion slot 16, the memory card 20 is electrically connected to the expansion slot 16. Therefore, the control module 12 can obtain relevant information on the memory card 20, such as the storage space size of the memory card or the status of the memory card.

Figure 3:
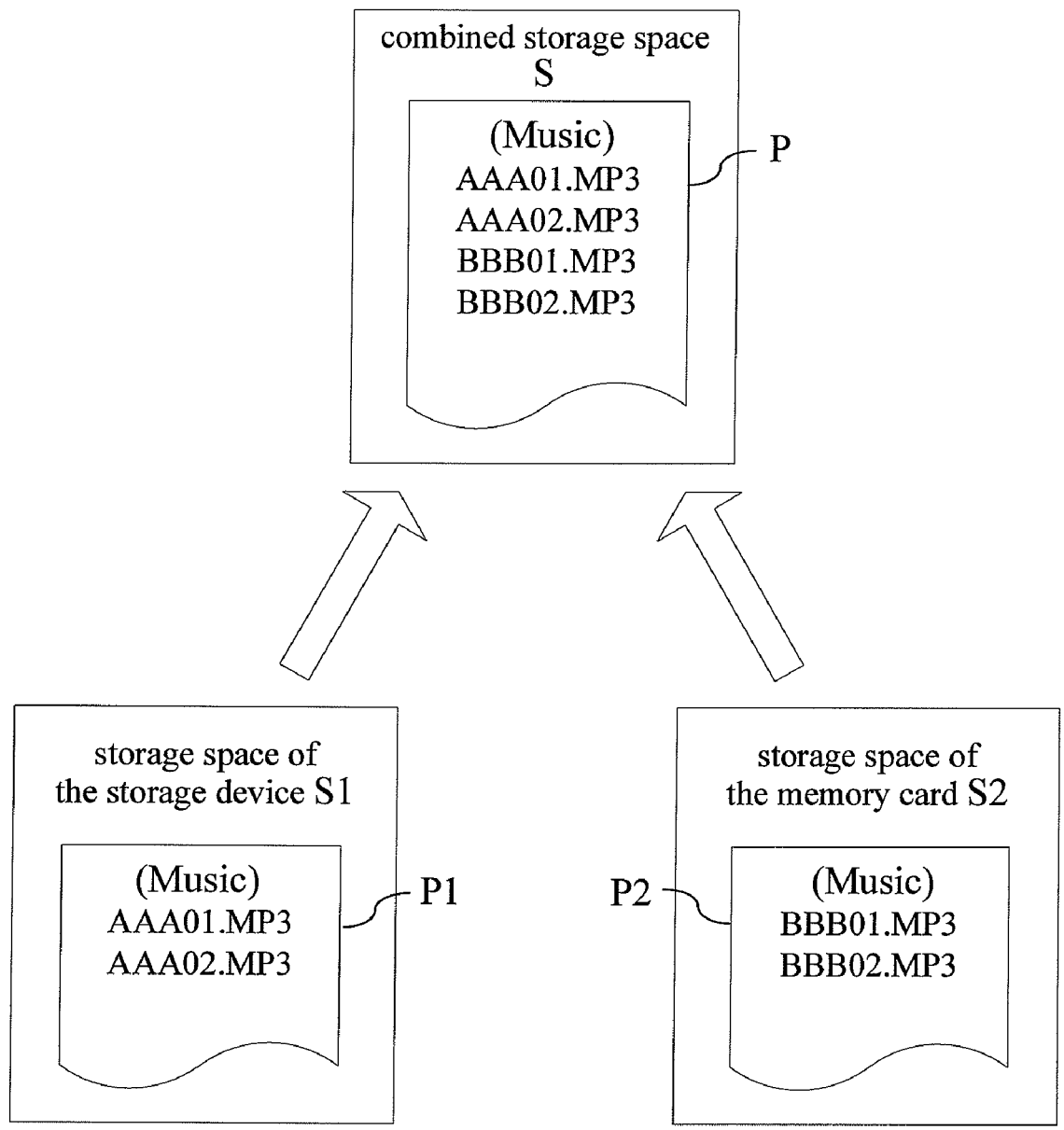
FIG. 3 is a schematic drawing of a method of managing memory storage space of the present invention.

Step 210: combining the storage space of the storage device 14 and the storage space of the memory card 20 to form a combined storage space S. FIG. 3 is a schematic drawing of a method of managing memory storage space of the present invention. As shown in FIG. 1 and FIG. 3, the computer 10 comprises the storage device 14. In this embodiment, the control module 12 uses an Another Union File System (AUFS). When detecting that the memory card 20 is inserted into the expansion slot 16 in step 200, the control module 12 utilizes the AUFS to combine the storage space Si of the storage device 14 and the storage space S2 of the memory card 20 to form the combined storage space S, which extends the available storage space of the computer 10. The combined storage space S includes all files and folders stored in the storage device 14 and the memory card 20.

For example, if the storage device 14 of the computer 10 has 2 GB storage space, then when a 4 GB memory card 20 is inserted into the expansion slot 16, the control module 12 utilizes the AUFS to combine the two storage spaces to form a 6 GB combined storage space S in the computer 10. Furthermore, all files and folders stored in the storage device 14 (2 GB) and the memory card 20 (4 GB) are all contained in the combined storage space S (6 GB). Therefore, the user can choose memory cards 20 with different storage spaces to increase the total storage space of the computer 10.

Even though the combined storage space S is shown by the computer 10 as one storage space, the combined storage space S is composed of the storage space of the storage device 14 and the storage space of the memory card 20. Since the AUFS has a function of evenly allotting files, when an external file is stored in the combined storage space S, the AUFS first detects the remaining storage space of the storage device 14 and the memory card 20 and then decides whether this external file should be allotted to the storage device 14 or the memory card 20 based on the size of the remaining storage space. With the characteristic of the AUFS, when an external file is stored in the combined storage space S, it is stored completely in the storage device 14 or the memory card 20, and not split or damaged. Moreover, the AUFS does not limit the format of the Union File System (such as FAT, FAT32 . . . etc.), Therefore, when the user needs to remove the memory card 20, he or she can directly pull out the memory card without damaging the files.

Furthermore, while the combined storage space S is formed, a first file folder P1 stored in the storage device 14 and a second file folder P2 stored in the memory card 20 are combined to form a combined file folder P. The first file folder P1 and the second file folder P2 have an identical title, and the combined file folder P includes all the files in the first file folder P1 and the second file folder P2. For example, if the storage device 14 and the memory card 20 each individually have a folder with title "Music" (herein called Music1 and Music2), then when the combined storage space S is formed, the Music folder (Music 1) in the storage device 14 and Music folder (Music2) in the memory card 20 are combined, and a new Music folder is generated in the combined storage space S. This new Music folder includes all files in the Music folder (Music1) stored in the storage device 14 and in the Music folder (Music2) stored in the memory card 20.

Figure 4:
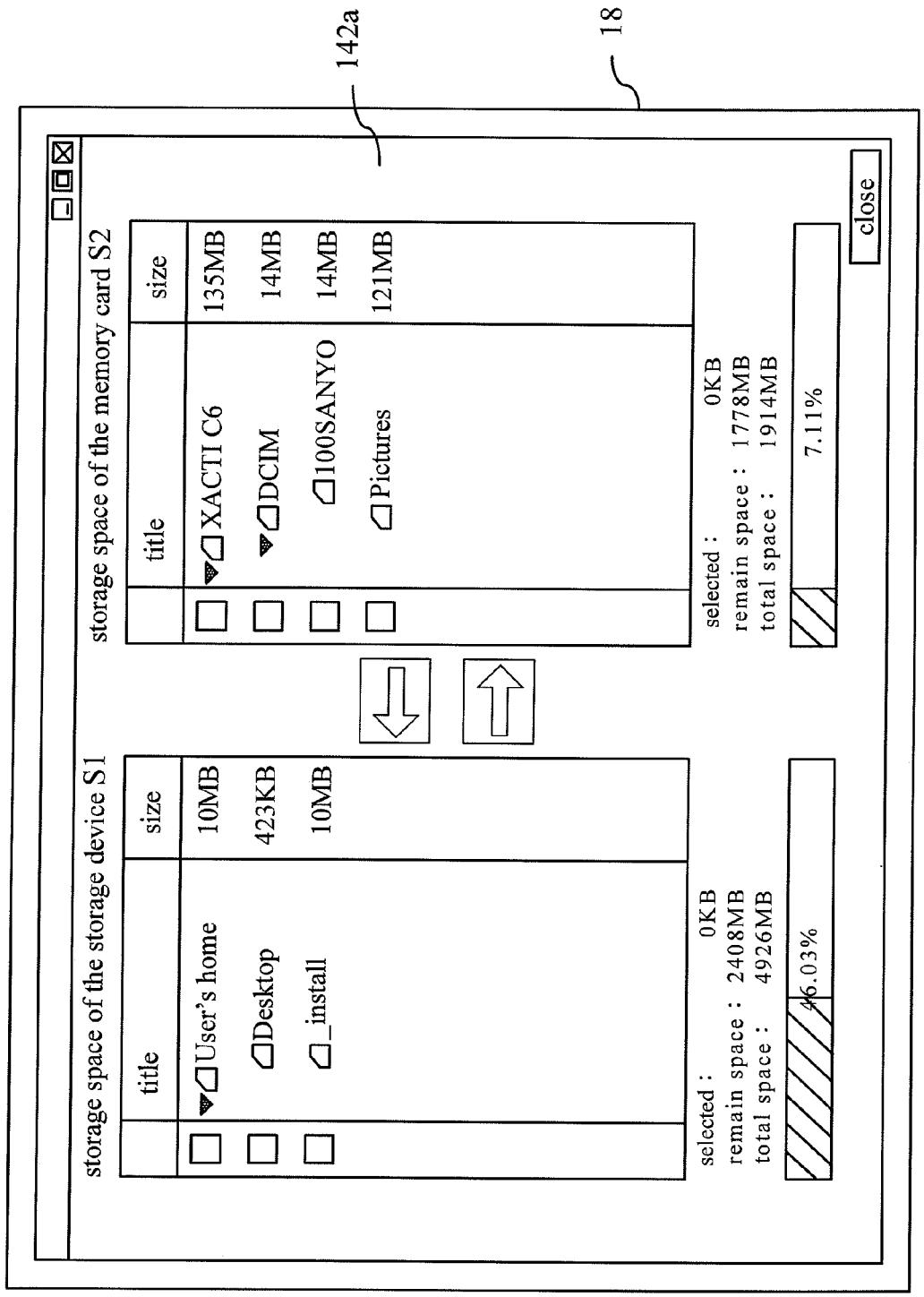
FIG. 4 is a schematic drawing of an application software interface of the computer system of the present invention.

Step 220: using application software to manage the combined storage space; with at least one file stored in the combined storage space selected to move between the storage device 14 and the memory card 20 via the application software. FIG. 4 is a schematic drawing of an application software interface of the computer system of the present invention. As shown in FIG. 1 and FIG. 4, the storage device 14 of the computer 10 stores an application software 142, and the application software 142 can be displayed on the display device 18 of the computer 10 via an interface 142a. By using the application software 142, the combined storage space can be divided into the storage space of the storage device 14 and the storage space of the memory card 20, and the application software interface 142a can individually display the two storage spaces for managing files. For example, if a 5 GB storage device 14 and a 2 GB memory card are combined to form a 7 GB combined storage space, the file folders (such as Desktop, _install, DCIM and Pictures folders . . . etc.) all exist at the same time in the combined storage space, but the application software 142 displays individual storage space statuses of the storage device 14 and the memory card 20, and the allotment status of the folders in the storage device 14 and the memory card 20 (Desktop and _install are stored in the storage device 14, and DCIM and Pictures are stored in the memory card 20), as shown in FIG. 4. Although the files are displayed as being stored in the combined storage space, the user can use the application software 142 to select files and move them into the storage device 14 or the memory card 20 if it is necessary or desirable.

In addition, the application software 142 can separately create a file folder with an identical title in the storage device 14 and the memory card 20, and the file folder is a predetermined file folder in common use according to the habits of general users. For example, the application software 142 is used to separately create a predetermined file folder "Music" in the storage device 14 and the memory card 20. When the user stores a new music file in the "Music" folder in the memory card 20 with another device and then inserts the memory card 20 into the expansion slot 16 of the computer 10, he or she can easily find the new music file in the combined "Music" folder P (composed of the "Music" folders P1 of the storage device 14 and P2 of the memory card 20) without repeatedly searching for the file.

Figure 5:
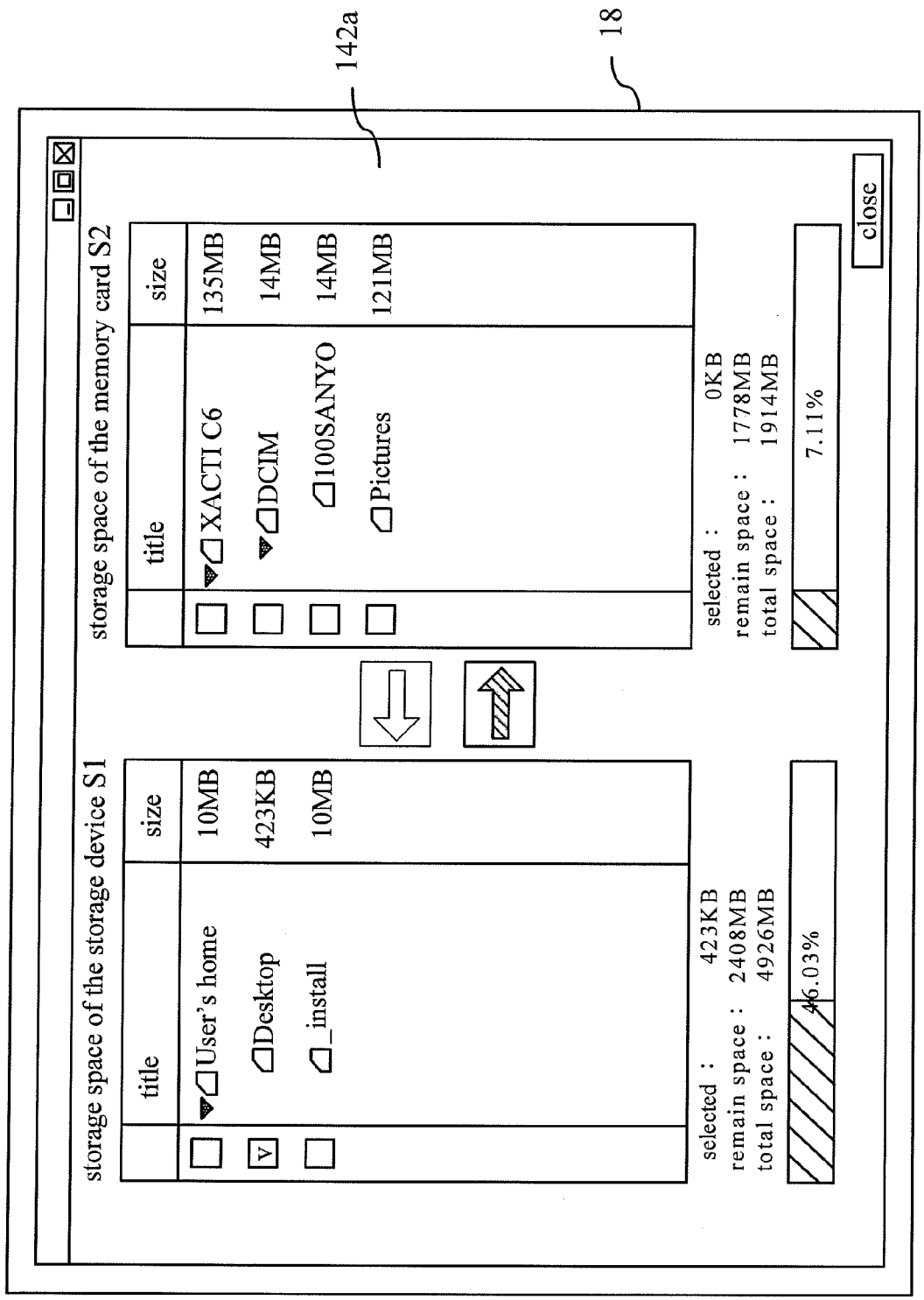
FIG. 5 is a schematic drawing of operating the application software interface of the computer system of the present invention.

Step 230: detecting whether there is a command for moving the at least one file from the storage device 14 to the memory card 20. FIG. 5 is a schematic drawing of operating the application software interface of the computer system of the present invention. As shown in FIG. 1 and FIG. 5, when the user inputs a command to move the file via the application software interface 142a, the application software 142 detects whether the command requires moving the at least one file from the storage device 14 to the memory card 20. As shown in FIG. 5, in this embodiment, the user can select the file or folder that needs to be moved via the application software interface 142a. The corresponding function keys for the command to move (the left and right arrows shown in FIG. 5) are displayed in selectable status (marked with slashed lines), and the user clicks the function keys to move the file between the storage device 14 and the memory card 20.

Step 240: detecting whether the storage space of the memory card 20 is sufficient. As shown in FIG. 1, the command is detected in step 230. The application software 142 first detects whether the memory card 20 has enough remaining storage space to contain the at least one file moved from the storage device 14. If the remaining storage space is sufficient, the file is moved directly. If the remaining storage space is insufficient, the following step will be performed.

Step 250: when the storage space of the memory card 20 is not enough, selecting at least one stored file in the memory card 20 to move to the storage device 14. As shown in FIG. 1, when the storage space of the memory card 20 is insufficient, the application software 142 can select and move at least one stored file in the memory card 20 to the storage device 14 to increase the usable storage space in the memory card 20. The application software 142 selects the at least one stored file in a sequence based on the size, filename extension, or usage frequency of the at least one stored file. However, other conditions of the stored data can also be used for the determination made by the application software 142. For example, comparing one large file and many small files using the same memory space in the memory card 20, it is less likely to cause file system space fragmentation by moving the large file, so the application software 142 prefers to move the large file. Alternatively, the application software 142 detects the type of selected file that needs to be moved to the memory card 20 in step 230. If most of the selected files are of the same type (such as music files or photo files), the files in the memory card 20 not of the same type will be preferably selected. Furthermore, files with lower usage frequency in the memory card 20 will be preferably selected also.

Finally, step 260: moving the at least one file from the storage device 14 to the memory card 20. As shown in FIG. 1, after step 250, the memory card 20 has enough storage space, so the application software 142 moves the at least one file from the storage device 14 to the memory card 20.

Figure 6:
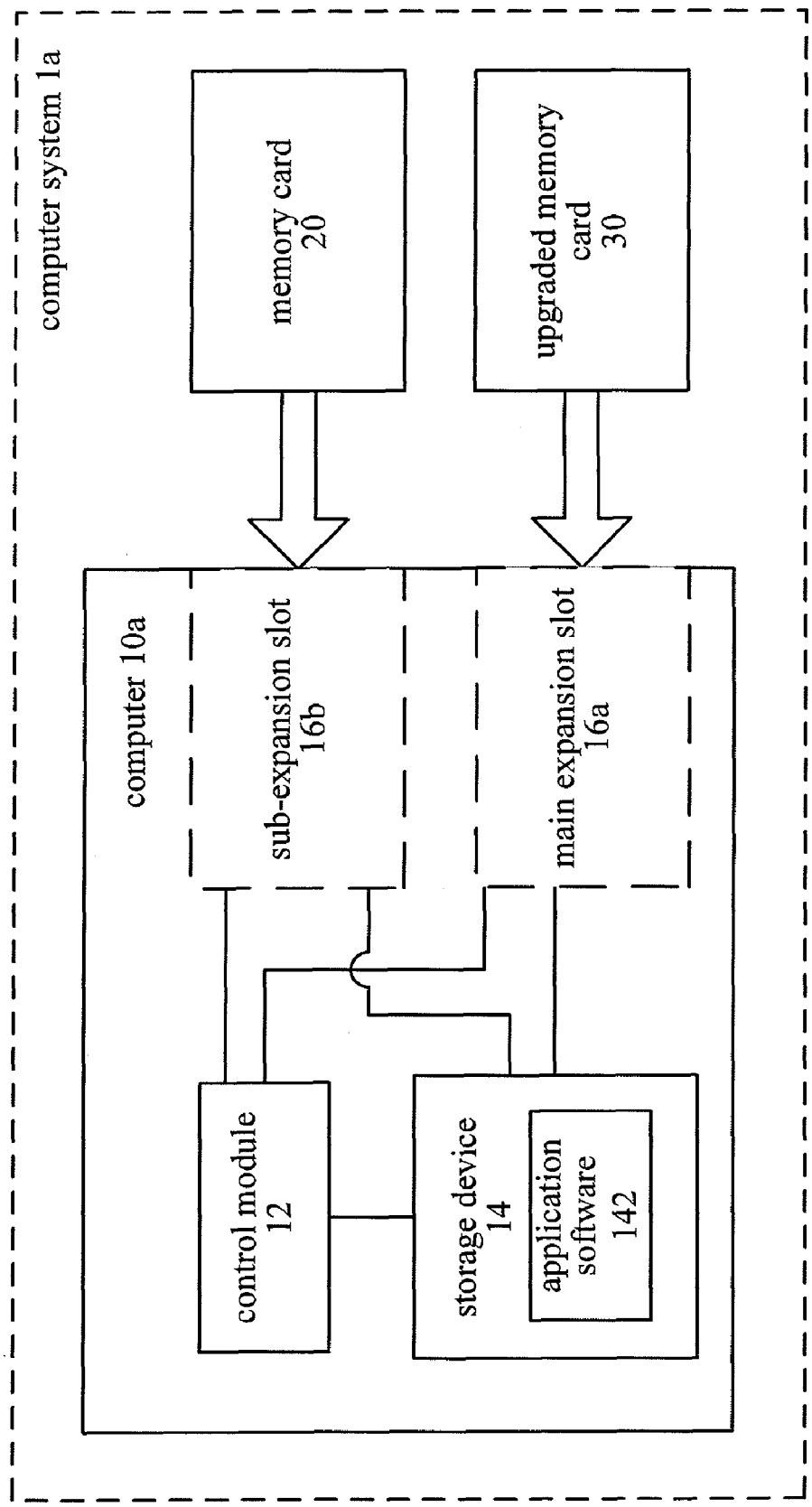
FIG. 6 is a system block drawing of a computer system in another embodiment of the present invention.

FIG. 6 is a system block drawing of a computer system in another embodiment of the present invention. In this embodiment, the computer system 1a comprises a computer 10a, a memory card 20, and an upgraded memory card 30. The computer 10a comprises the control module 12, the storage device 14, a main expansion slot 16a, and a sub-expansion slot 16b. The control module 12 uses the AUFS, and the control module 12 is electrically connected to the storage device 14, the main expansion slot 16a, and the sub-expansion slot 16b. The upgraded memory card 30 matches the main expansion slot 16a, and the memory card 20 matches the sub-expansion slot 16b. Furthermore, the storage space of the upgraded memory card 30 is larger than or equal to the storage space of the memory card 20.

Figure 7:
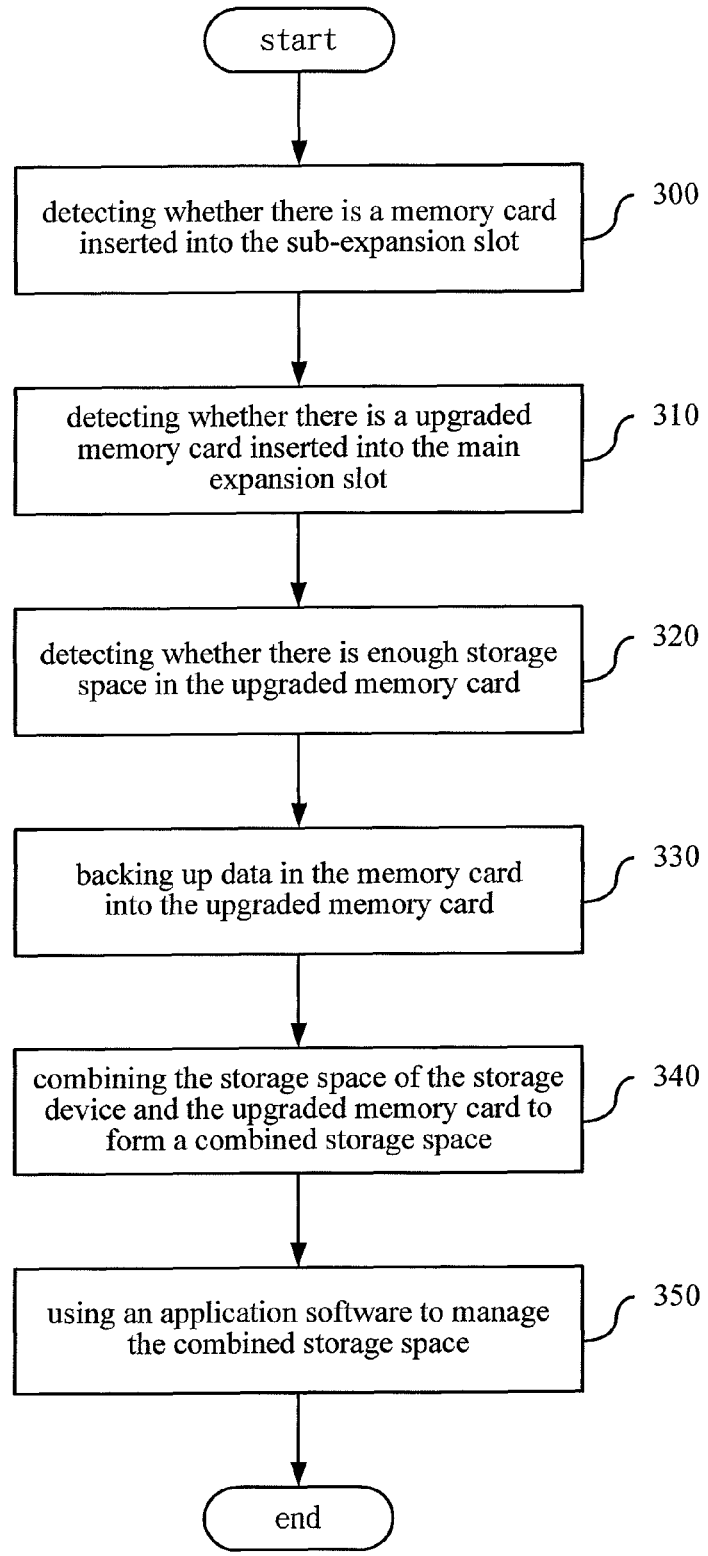
FIG. 7 is a flowchart of a method of managing memory storage space of another embodiment of the present invention.

FIG. 7 is a flowchart of a management method of the memory storage space of another embodiment of the present invention. Although the following description uses the computer system 1a shown in FIG. 6 to explain the method of managing memory storage space, other similar computer systems can also be suitable for the method of managing memory storage space of the present invention. As shown in FIG. 7, the method of managing memory storage space of the present invention comprises step 300 to step 350. The following description explains each step of the method of managing memory storage space of the present invention.

Step 300: detecting whether there is a memory card 20 in the sub-expansion slot 16b. As shown in FIG. 6, the computer 10a can detect the status of the sub-expansion slot 16b via the control module 12. When the memory card 20 is inserted into the sub-expansion slot 16b, the memory card 20 is electrically connected to the sub-expansion slot 16b. Therefore, the control module 12 can obtain relevant information on the memory card 20.

Step 310: detecting whether there is an upgraded memory card 30 in the main expansion slot 16a. As shown in FIG. 6, similar to step 300, the computer 10a can detect the status of the main expansion slot 16a via the control module 12. When the upgraded memory card 30 is inserted into the main expansion slot 16a, the upgraded memory card 30 is electrically connected to the main expansion slot 16a. Therefore, the control module 12 can obtain relevant information on the upgraded memory card 30.

Step 320: detecting whether the storage space of the upgraded memory card 30 is sufficient. As shown in FIG. 6, with the relevant information on the memory card 20 and the upgraded memory card obtained in step 300 and step 310, the control module 12 detects whether the remaining storage space of the upgraded memory card 30 is sufficient to contain all files stored in the memory card 20. If the storage space is sufficient, the following step is performed.

Step 330: backing up data stored in the memory card 20 into the upgraded memory card 30. As shown in FIG. 6, if the remaining storage space of the upgraded memory card 30 is sufficient, the control module 12 executes a back up process to store all file data in the memory card 20 into the upgraded memory card 30.

Step 340: combining the storage space of the storage device 14 and the storage space of the upgraded memory card 30 to form a combined storage space. As shown in FIG. 6, after step 330, the control module 12 uses the AUFS to combine the storage space of the storage device 14 and the storage space of the upgraded memory card 30 to form a combined storage space.

Finally, step 350: using application software 142 to manage the combined storage space, with at least one file stored in the combined storage space selected to move between the storage device 14 and the upgraded memory card 30 via the application software 142. As shown in FIG. 6, the application software 142 divides the combined storage space into the storage space of the storage device 14 and the storage space of the upgraded memory card 30 so that it is easier for the user to manage files. Therefore, the user can change the memory card in the computer system 1a through a simple process of upgrading the memory card and manage the storage space of the computer system 1a.

With the design of the present invention, typical memory cards can be integrated with the storage device of the computer to expand the storage space of the computer, and the application software can perform file management in the computer storage space. When the storage space of the original memory card is insufficient, the method of the present invention can be used for upgrading the original memory card to another memory card with a larger storage space for convenience.

Although the present invention has been explained in relation to its preferred embodiments, it is to be understood that many other possible modifications and variations can be made without departing from the spirit and scope of the invention as hereinafter claimed.

What is claimed is:

1. A memory storage managing method for a computer, the computer comprising a storage device and an expansion slot; the method comprising:
  detecting whether there is a memory card inserted into the expansion slot;
  combining the storage space of the storage device and the memory card to form a combined storage space; and
  using an application software to manage the combined storage space; wherein at least one file stored in the combining storage space is selected to move between the storage device and the memory card via the application software.

2. The method as claimed in claim 1, wherein an Another Union File System (AUFS) is used for combining the storage device and the memory card.

3. The method as claimed in claim 2, wherein when an external file is stored in the combined storage space, the AUFS decides whether to allot the external file to the storage device or to the memory card based on the remaining storage space on the storage device and the memory card.

4. The method as claimed in claim 3, wherein the external file is completely allotted to the storage device or the memory card.

5. The method as claimed in claim 1, wherein the combined storage space comprises all files and folders originally stored in the storage device and the memory card.

6. The method as claimed in claim 1, wherein while combining the storage space of the storage device and the memory card, a first file folder stored in the storage device and a second file folder stored in the memory card is combined to form a combined file folder; wherein the first file folder and the second file folder have an identical file title, and wherein the combined file folder includes all files in the first file folder and the second file folder.

7. The method as claimed in claim 1, wherein the application software individually displays the combined storage space with the storage space of the storage device and the storage space of the memory card for managing files.

8. The method as claimed in claim 7, wherein the application software creates file folders having an identical file title in the storage space of the storage device and the storage space of the memory card.

9. The method as claimed in claim 1 further comprising:
   detecting whether there is a command for moving the at least one file from the storage device to the memory card;
   detecting whether the storage space of the memory card is sufficient; and
   when the storage space of the memory card is insufficient, selecting at least one stored file in the memory card to move to the storage device; and moving the at least one file from the storage device to the memory card.

10. The method as claimed in claim 9, wherein the application software detects whether the at least one stored data should be moved based on size, title, or usage frequency of the at least one stored file.

11. A computer system comprising:
    a memory card; and
    a computer comprising:
    a storage device storing an application software;
    at least one expansion slot corresponding to the memory card; and
    a control module electrically connected to the storage device and the at least one expansion slot, with the control module detecting whether the at least one expansion slot contains a memory card, and wherein the control module utilizes an Another Union File System (AUFS) to combine the storage space of the storage device and the memory card to form a combined storage space;
    wherein the application software is used to manage the combined storage space, and wherein at least one file stored in the combined storage space is selected to move between the storage device and the memory card via the application software.

12. The computer system as claimed in claim 11, wherein when an external file is stored in the combined storage space, the AUFS decides whether to allot the external file to the storage device or to the memory card based on the remaining storage space of the storage device and the memory card.

13. The computer system as claimed in claim 12, wherein the external file is completely allotted to the storage device or the memory card.

14. The computer system as claimed in claim 11, wherein the combined storage space comprises all files and folders originally stored in the storage device and the memory card.

15. The computer system as claimed in claim 11, wherein the combined storage space comprises a combined file folder; wherein the combined file folder is formed by a first file folder stored in the storage device and a second file folder stored in the memory card, and wherein the first file folder and the second file folder have identical titles.

16. The computer system as claimed in claim 15, wherein the combined file folder includes all files in the first file folder and the second file folder.

17. The computer system as claimed in claim 11, wherein the application software individually displays the combined storage space with the storage space of the storage device and the storage space of the memory card for managing files.

18. The computer system as claimed in claim 17, wherein the application software creates file folders having an identical file title in the storage space of the storage device and the storage space of the memory card.

19. A computer system comprising:
    a memory card;
    a upgraded memory card; and
    a computer comprising:
    a storage device storing application software;
    a main expansion slot corresponding to the upgraded memory card;
    a sub-expansion slot corresponding to the memory card; and
    a control module electrically connected to the storage device, the main expansion slot and the sub-expansion slot; wherein the control module detects whether the upgraded memory card and the memory card are correspondingly inserted into the main expansion slot and the sub-expansion slot and backs up the data stored in the memory card on the upgraded memory card; and wherein the control module uses an Another Union File System (AUFS) to combine the storage space of the storage device and the upgraded memory card to form a combined storage space;
    wherein the application software is used to manage the combined storage space, wherein at least one file stored in the combined storage space is selected to move between the storage device and the memory card via the application software.

* * * * *